Feb. 12, 1924.

R. V. MARTIN 1,483,099

TRANSMISSION FOR MOTOR VEHICLES

Filed June 17, 1919      4 Sheets-Sheet 1

Roy V. Martin.
INVENTOR

BY Francis St. J. Fox
ATTORNEY

Feb. 12, 1924.

R. V. MARTIN 1,483,099

TRANSMISSION FOR MOTOR VEHICLES

Filed June 17, 1919   4 Sheets-Sheet 2

Roy V. Martin.
INVENTOR

BY Francis G. J. Fox
ATTORNEY

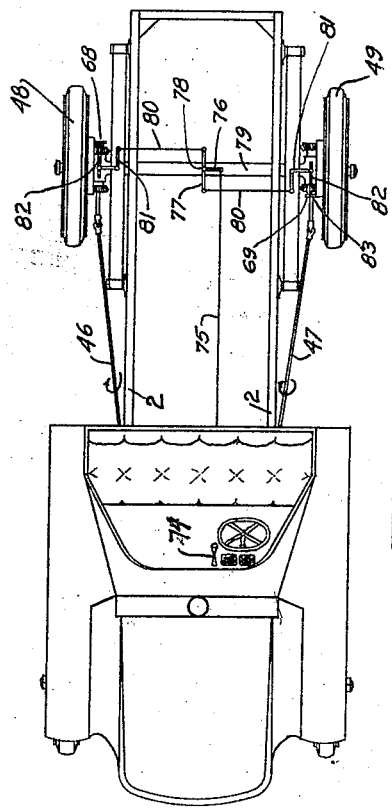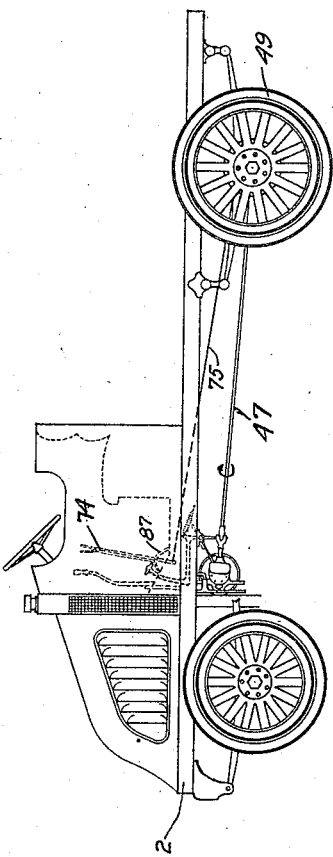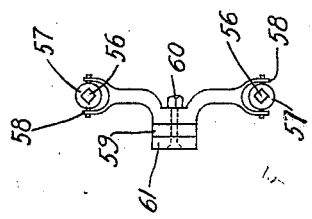

Feb. 12, 1924.
R. V. MARTIN
1,483,099
TRANSMISSION FOR MOTOR VEHICLES
Filed June 17, 1919  4 Sheets-Sheet 4
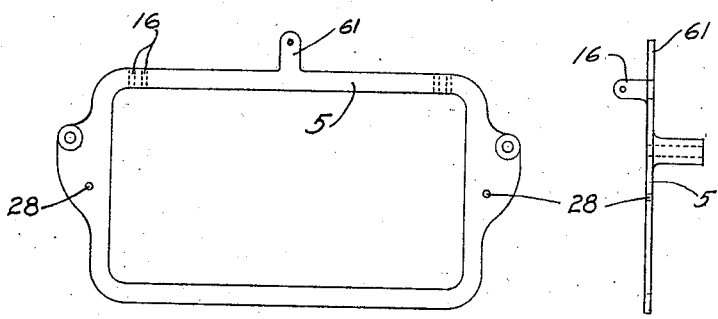
Fig.11.  Fig.12.
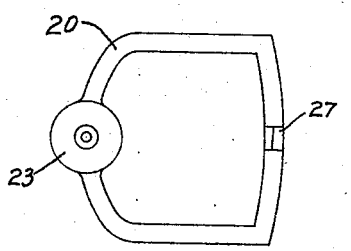 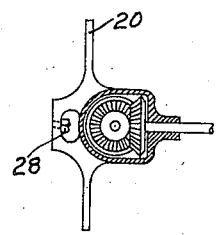 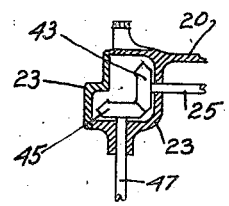
Fig.13.  Fig.14.  Fig.15.
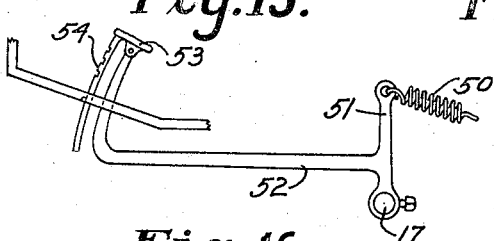 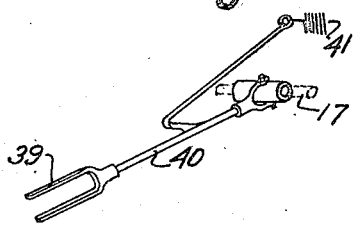
Fig.16.  Fig.17.
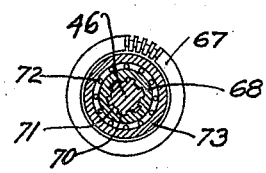 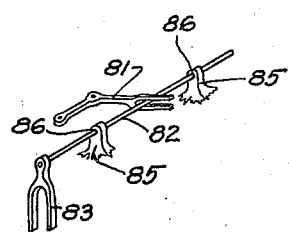
Fig.18.  Fig.19.
Roy V. Martin.
INVENTOR
BY Francis St. J. Cox
ATTORNEY Patented Feb. 12, 1924.

1,483,099

UNITED STATES PATENT OFFICE.

ROY V. MARTIN, OF OAKLAND, CALIFORNIA.

TRANSMISSION FOR MOTOR VEHICLES.

Application filed June 17, 1919. Serial No. 304,807.

*To all whom it may concern:*

Be it known that I, ROY V. MARTIN, a citizen of the United States, and a resident of the city of Oakland, county of Alameda, and State of California, have invented Improvements in Transmission for Motor Vehicles; and I do hereby declare the following to be a full, clear, and exact description of my invention, such as will enable others skilled in the art to which it appertains to make and use the same.

My invention relates to improvements in transmission for motor vehicles; and it consists in the novel construction, combination and arrangement of parts as hereinafter described, and later claimed.

The objects of my invention are to provide means whereby the speed of the vehicle may gradually be increased or decreased without the aid of change-speed gears; to provide means for compensating the different speeds at which the rear wheels turn when the vehicle is traveling on a curve without the aid of a differential; to provide a mechanism whereby the full power of the engine may be utilized at all times when the car is in motion; to provide means whereby the full power of the engine may be applied to either rear driving wheel whenever necessary; and to provide a mechanism efficient, durable, compact, and easily accessible, at a low manufacturing cost.

In order that my invention may be clearly understood and readily carried into effect, the same is described with reference to the accompanying drawings, in which similar numerals indicate like parts:

Fig. 9, is a plan view of the vehicle.

Fig. 10, is a side elevation of the vehicle viewed from the left.

Fig. 11, is a rear view of the supplemental frame stripped.

Fig. 12, is an end view of Fig. 11.

Fig. 13, is a rear view of one hinged frame (left).

Fig. 14, is an end view of left-hand hinged frame, partly in section showing final drive shaft.

Fig. 15, is a section view of left-hand hinged frame.

Fig. 16, is a side view of clutch pedal.

Fig. 17, is a detail showing shift for friction-disks.

Fig. 18, is a sectional detail showing rear of final drive shaft.

Fig. 19, is a detail showing reverse gear operating mechanism.

Fig. 20, is a detail showing a plan view of equalizer.

Figure 1:
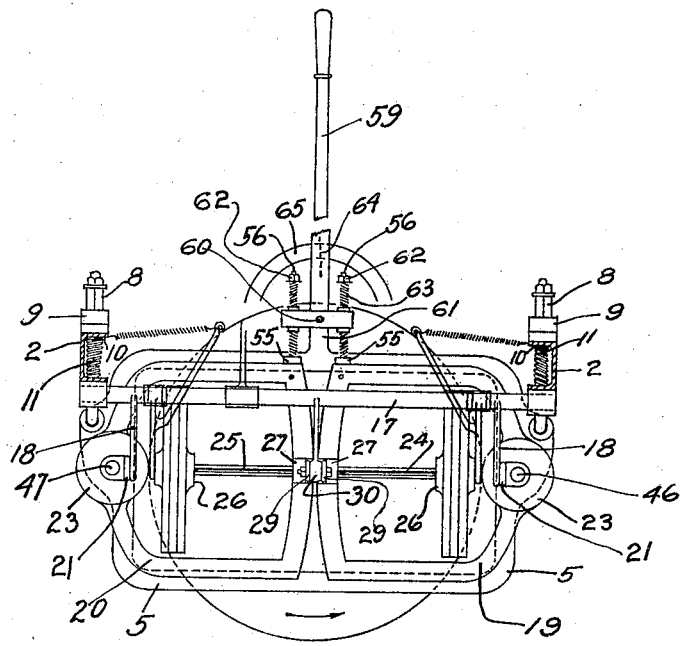
Fig. 1, is an elevation of the transmission viewed from the rear.

In detail, my construction consists of a main frame, 2, comprised of channel-irons which support or carry the engine, transmission, front and rear axles, etc. Upon the inner end of the shaft, 3, of the engine (not shown in the drawings) is mounted a fiber-faced driving-disk, 4. At right angles to the main frame and between the side pieces thereof is a supplemental frame, 5, adapted to receive at each end the forward portion, 6, of a right-angled bar whose other portion, 7, extends upwards through an opening provided in the flanges of the said main frame and at right angles thereto. The upper end of said portion, 7, is threaded to receive the square thimbles, 8. Mounted on top of said main frame are two blocks, 9, adapted to receive said thimbles and to constitute proper bearings for the same. The lower portions of said thimbles are provided with suitable washers, 10. Between said washers and the lower flanges of the said channel-irons of the main frame are interposed springs, 11, of sufficient strength to hold the supplemental frame, 5, with its several mountings in its proper position.

To a rotatable shaft, 12, suitably mounted in the main frame in advance of said driving-disk are rigidly affixed two arms, 13, provided with slots, 14, adapted to receive the bolts, 15, carried by the lugs, 16, with which said supplemental frame is provided. These arms act as guides for said supplemental frame when the same is advanced towards said driving-disk, and also as equalizers when said supplemental frame moves upwards or downwards. By reason of the slots, 14, the said supplemental frame may be further advanced forward to compensate for any wearing away of the surface of the driving-disk caused by the friction of the friction-disks.

A second rotatable shaft, 17, is suitably mounted on the main frame to the rear of the transmission mechanism. Rigidly affixed to said shaft and extending downwards therefrom are two arms, 18, connecting with swinging frames, 19 and 20, by the links, 21, which swivel at each end on suitable connections, 22, carried by both said arms, 18, and said frames, 19 and 20.

The outer ends of said swinging frames are provided with housings, 23, which constitute bearings for the outer ends of the right and left hand shafts 24 and 25, respectively, for the friction-disks, 26, which turn with said shafts. The inner ends of said shafts are provided with the bearings, 27, which are carried on the inner portions of the swinging frames, 19 and 20. Said swinging frames at their outer ends are hinged within said supplemental frame, as at 28. Said bearings, 27, are connected with said rotatable shaft, 17, by the links, 29, swivelled at one end to said bearings and swivelled at their other end to the dependent arm, 30, which is rigidly affixed to said rotatable shaft, 17.

Figure 4:
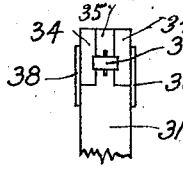
Fig. 4, is a detail of one of the friction-disks series.
Figure 5:
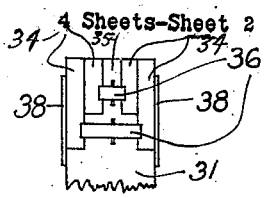
Fig. 5, is a view showing a modified form of construction of the friction-disks.
Figure 3:
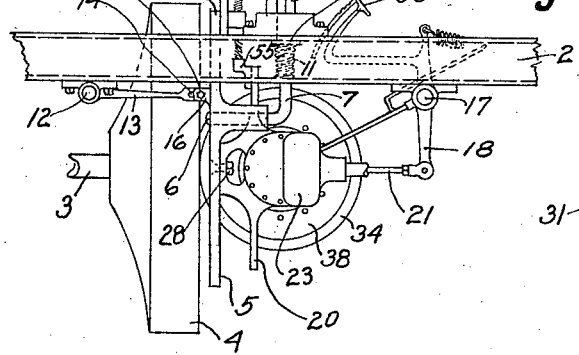
Fig. 3, is a side elevation of the transmission, viewed from the left.
Figure 6:
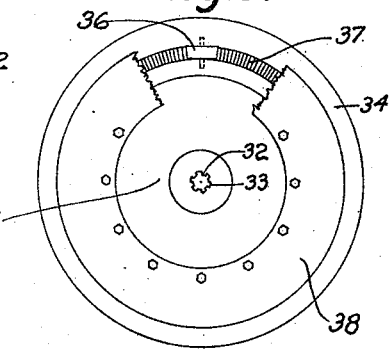
Fig. 6, is a side view of the friction-disks, partly broken away.
Figure 7:
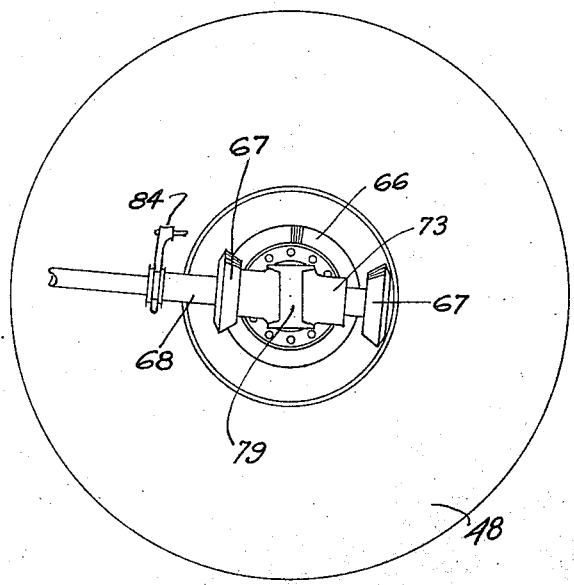
Fig. 7, is an elevation of the right rear wheel viewed from the inside.
Figure 8:
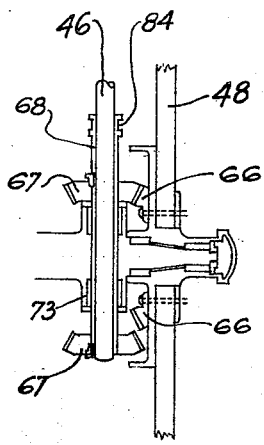
Fig. 8, is a sectional plan view of the right-hand final drive shaft and rear wheel.

The friction-disks are in series, of which one member, 31, is provided at its inner central portion with jaw-clutches, 32, which engage longitudinal grooves, 33, with which their respective shafts, 24 and 25, are provided. (See Figs. 4, 5 and 6.) Said friction-disks are thus adapted to slide back and forth on said shafts and at the same time may turn with said shafts. The other members in the series are comprised of rings, 34, which encircle shoulders, 35, provided on member, 31, and turn free upon the same. The member, 31, is provided at intervals with suitably mounted bevel-gears, 36, which engage the internal gears, 37, with which each of said rings is provided. Guards, 38, suitably attached to said member, 31, hold said rings in contact with said bevel-gears, 36. By means of this construction a broad friction surface is provided all parts of which turn at the same rate of speed relative to the center of disk 4, although each travels at a different rate of speed from each other around their common bearing shaft. By means of forks, 39, at the outer ends of shift-bars, 40, fulcrumed on said shaft, 17, and controlled by springs, 41, interposed between said main frame and the rearward ends of said shift-bars, said friction-disks are held at the inner ends of their respective shafts when the vehicle is standing or is running at its lowest speed.

Suitably mounted on the outer ends of the shafts, 24 and 25, are bevel-gears, 42 and 43, respectively, which mesh with bevel-gears, 44 and 45, respectively, suitably mounted on the forward ends of the final drive shafts, 46 and 47, respectively, leading to the rear wheels, 48 and 49, respectively.

Figure 2:
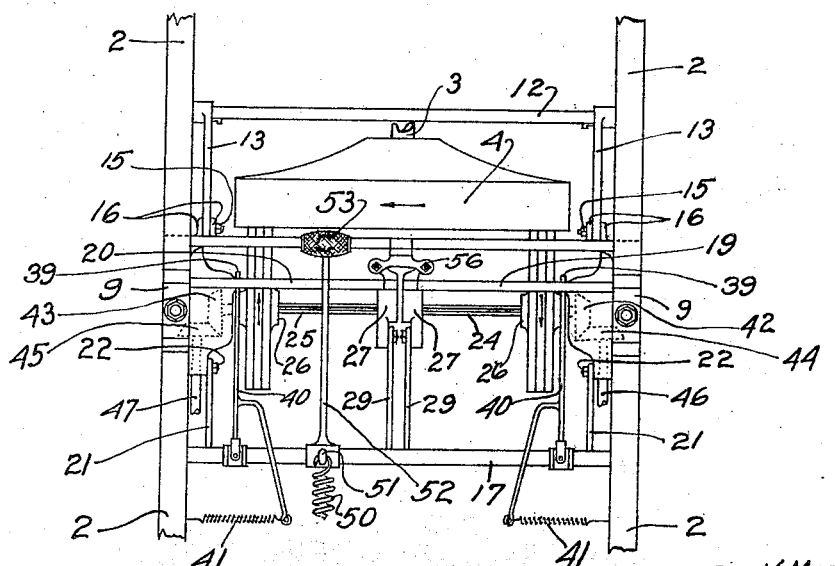
Fig. 2, is a plan view of the transmission.

By means of the spring, 50, (see Figs. 2 and 16) attached at one end to said main frame and at the other end to the lug, 51, projecting upwards from the lever, 52, which is rigidly affixed to the rotatable shaft, 17, the friction-disks are held in contact with the driving-disk, 4, at right angles to its face; and by means of the said clutch-lever provided with suitable foot-pedal, 53, and locking-device, 54, said contact between said friction-disks and said driving-disk may be broken.

Projecting forward from the upper inner corners of said swinging frames, 19 and 20, are lugs, 55, adapted to swivel thereon. (See Fig. 1.) Upon these lugs are mounted posts, 56, which extend upwards through the blocks, 57, adapted to turn in the forks, 58, attached to the lower portion of a shift-lever, 59, which also is adapted to pivot on a bolt, 60, carried by a lug, 61, projecting upward from the central portion of said supplemental frame, 5. Each of said posts is provided at its upper end with a lock-nut, 62, and each post also is provided with springs, 63, one interposed between said lug, 55, and said block, 57, and another interposed between said lock-nut, 62, and said block. The lever, 59, projects upwards through the floor of the car within easy reach of the operator and when in its neutral position is held in the notch, 64, provided in the center of the sector, 65, mounted in the floor of the car. Therefore, by shifting the lever, 59, to the right the right-hand swinging frame, 19, is lowered and the left-hand swinging frame, 20, is raised; and by shifting said lever to the left the left-hand swinging frame is lowered and the right-hand swinging frame is raised. As either of said swinging frames rise the post attached thereto also rises and in so doing the lower of the two springs encircling said post is compressed. Similarly the upper spring of the two is compressed when the same swinging frame is lowered. Therefore, as said lever is shifted, either to the right or to the left, opposite upper and lower springs will be compressed opposedly to each other.

The rear wheels, 48 and 49, (see Figs. 9 and 10) are provided with internal bevel-gears, 66, adapted to mesh with bevel-gears, 67, keyed on each end of the sleeves, 68 and 69, slidably mounted on the final drive shafts, 46 and 47, respectively, by means of jaw-clutches, 70, which engage the grooves, 71, provided in said shafts. Roller bearings, 72, are interposed between the said sleeves and the housings, 73. When the engine is running shafts 46 and 47 both turn in the same direction. Therefore, the forward bevel-gear, 67, on the left-hand sleeve, 69, meshes with the internal-gear, 66, on the left rear wheel, 49, and the rear bevel-gear, 67, on the right-hand sleeve, 68, meshes with the internal-gear on the right rear wheel, 48, when the car is going forward. When in reverse, the rear bevel-gear on the left-hand sleeve, 69, and the forward bevel-gear on the right-hand sleeve, 68, mesh with their respective internal-gears, 66, on said rear wheels. The change of direction forward to reverse, or vice versa, is effected by means of the suitably mounted shift-lever, 74, connected by the rod, 75, to the arm, 76, projecting at right angles to the bar, 77, pivoted at its center, 78, to the rear axle, 79. Rods, 80, at each end of the bar, 77, connect the same to the angle-bars, 81, pivoted to said rear axle. Said angle-bars at their outer ends are slotted to receive the shift-rods, 82, which carry at their ends vertically disposed yokes, 83, which engage the grooves, 84, on said sleeves. Mounted on the housings, 73, are lugs, 85, provided with the eyelets, 86, which constitute guides for said shift-rods, 82. When the change of direction has been effected the shift-lever, 74, is locked in position by any suitable locking-device, as at 87.

When the engine is running the driving-disk turns to the right, as indicated by the arrow. When the friction-disks, which are at the inner ends of their respective shafts when at rest, are brought into contact with the driving-disk through manipulation of the pedal, 52, the left-hand series of friction-disks turn to the right, as indicated by the arrow, and the right-hand series of friction-disks turn to the left, as indicated by the arrow. Power is transmitted to the rear wheels from the said friction-disks through the shafts, 24 and 25, the bevel-gears, 42 and 43, and 44 and 45, the final drive shafts, 46 and 47, and the bevel-gears, 66 and 67. The car will then be running at low speed. To increase the speed of the car the operator shifts the shift-speed lever, 59, to his right, thereby lowering the right-hand swinging frame in which shaft 24 is mounted, and raising the left-hand swinging frame in which shaft 25 is mounted. The effect is as follows: Each series of friction disks will creep outward on their respective shafts, 24 and 25, until each is equidistant from the center of the driving-disk. Upon releasing the shift-speed lever the action of the springs, 63, (opposite upper and lower opposedly compressed as before described) will bring the said swinging frames to a horizontal position and the shafts, 24 and 25, will then be in the same plane. In the meanwhile said friction-disks will remain equidistant on their respective shafts from the center of said driving-disk according to the distance the operator has shifted the shift-speed lever. As any point on the radius on the face of the driving-disk will move at a higher speed than any other point closer from it to the center of said driving-disk, it is obvious that the further distant the friction-disks are from the center of the driving-disk when in contact with the same the higher the speed of the car.

When the lever, 52, is released and the contact between the driving-disk and the friction-disks is broken the action of the springs, 41 on the shift-bars, 40, brings the friction-disks back to their normal position, i. e. to the inner ends of their respective shafts, 24 and 25. To decrease the speed of the car, the operator shifts the shift-speed-lever to his left, thereby lowering the left-hand shaft 25, and raising the right-hand shaft 24. Each series of friction-disks will thereupon creep inward on their respective shafts until each is equidistant from the center of the driving-disk.

When the car is turned off a straight course, whether the turn in the roadway be to the right or to the left, the tendency is for the inside rear wheel to "drag" and for the outside rear wheel to "accelerate". If the turn is to the left, the effect is as follows: The supplemental frame is depressed against the action of the springs, 11, thus carrying the plane of the shafts, 24 and 25, mounted in the swinging frames, below the center of the driving-disk. This will occur because the left-hand series of friction-disks which are traveling at a slower speed than the driving-disk, due to the "drag" caused by the inside rear wheel, will be forced below the center of said driving-disk by the force imparted by the latter; while, synchronously, the right-hand series of friction-disks which are traveling at a higher speed than the driving-disk, due to the "acceleration" caused by the outside rear wheel, will climb the face of said driving-disk. Therefore, when the plane of these shafts is below the center of the driving-disk all the friction-disks will move laterally to the right on their respective shafts until they have reached such position thereon where both the "drag" and the "acceleration" of left and right rear wheels, respectively, have been relieved. When the turn in the roadway has been traversed and the car is again traveling on a straight course, the pressure of the springs, 11, will bring the supplemental frame back to its normal position, in which case the plane of the shafts, 24 and 25, will be in the center of the driving-disk, and each series of friction-disks will return to the positions on their respective shafts, equidistant from said center, which they occupied before the turn in the roadway was encountered. If the turn in the roadway is to the right, the reverse to the effect just described is had upon the supplemental frame and friction-disks, as in this case the plane of the shafts for said friction-disks is raised above the center of said driving-disk; furthermore, gravity will cause the supplemental frame with its mountings to drop until the action of the springs, 11, holds said frame in its normal position with the plane of said shafts in the center of said driving-disk.

Having thus described my invention, what I desire to claim and to secure by Letters Patent, is:

1. In a transmission for motor vehicles, a main frame, a fiber-faced driving-disk, a supplemental frame suspended from said main frame, two independent swinging frames carried by said supplemental frame, separate horizontal shafts normally on the same plane across the center of the face of said driving-disk, means for changing the planes of said shafts with respect to each other, means for raising or lowering in unison the planes of said shafts above or below the center of the face of said driving-disk, friction-disks in series adapted to move laterally on said horizontal shafts, means for establishing and breaking contact between the face of said driving-disk and said friction-disks, and means for transmitting motion from said friction-disks to the rear wheels of said vehicle.

2. In a transmission for motor vehicles, a main frame, a fiber-faced driving-disk, means for increasing or decreasing the speed of the car, the same consisting of a supplemental frame suspended from said main frame and adapted to advance towards or recede from said driving-disk, a pair of independent hinged frames pivoted in said supplemental frame, separate horizontal shafts normally positioned in the same plane with each other in said hinged frames, means for automatically changing the planes of said shafts with respect to each other, friction-disks in series carried by said shafts and adapted to move laterally thereon, and means to transmit motion to said rear wheels.

3. In a transmission for motor vehicles, a main frame, a fiber-faced driving-disk, a supplemental frame suspended from said main frame, independent frames pivotally mounted on said supplemental frame, friction-disks in series mounted on said independent frames and adapted to contact with said driving-disk at right angles to the face thereof, means for changing the point of contact between said friction-disks and said driving-disk in order to increase or decrease the speed of the car, said means consisting of separate horizontal shafts for each series of friction-disks normally on the same plane across the center of the face of said driving-disk and means for automatically changing the planes of said shafts with respect to each other, and means for transmitting motion from said friction-disks to the rear wheels of the vehicle.

4. In a transmission for motor vehicles, a main frame, a fiber-faced driving-disk, a supplemental frame suspended from said main frame, independent frames pivoted in said supplemental frame, friction-disks in series mounted in said independent frames and adapted to contact with said driving-disk at right angles to the face of the latter, separate horizontal shafts for each series of friction-disks normally positioned on the same plane across the center of the face of said driving-disk, means for automatically changing the planes of said horizontal shafts with respect to each other, means for raising or lowering in unison the planes of said horizontal shafts above or below the center of the face of said driving-disk, means whereby all the friction-disks of a series will revolve at different rates of speed, means for changing the point of contact between said friction-disks and said driving-disk in order to vary the speed of the car, and means for transmitting motion from said friction-disks to the rear wheels of said vehicle.

5. In a transmission for motor vehicles, a main frame, a fiber-faced driving-disk, a supplemental frame suspended from said main frame, movable frames hinged in said supplemental frame, separate horizontal shafts mounted in said movable frames normally positioned on the same plane across the center of the face of said driving-disk, means for automatically changing the planes of said horizontal shafts with respect to each other, right and left hand series of friction-disks mounted on said horizontal shafts and adapted to move laterally thereon either towards, away from, or in the same direction with each other, and means for imparting to the rear wheels of said vehicle the motion imparted to said friction-disks by said driving-disk.

6. In a transmission for motor vehicles, a main frame, a fiber-faced driving-disk, a supplemental frame suspended from said main frame, separate frames hinged in said supplemental frame, separate shafts carried by said hinged frames and normally positioned on the same plane across the center of the face of the driving-disk, means for automatically changing the planes of said shafts with respect to each other, friction-disks in series mounted on said shafts and adapted to revolve at varying rates of speed either in unison or independent of each other when in contact with said driving-disk, and means for imparting to the rear wheels of said vehicle the motion imparted to said friction-disks by said driving-disk.

7. In a transmission for motor vehicles, a fiber-faced driving-disk, independent horizontal shafts normally positioned on the same plane across the center of the face of said driving-disk, means for automatically changing the planes of said shafts with respect to each other, right and left hand groups of friction-disks slidably mounted on said horizontal shafts and adapted to contact with the face of said driving-disk and to receive motion therefrom, means for compensating the respective speeds of the rear wheels when the vehicle is running off a straight course, and means for imparting motion to the rear wheels of the vehicle.

8. In a transmissin for motor vehicles, a fiber-faced driving-disk, independent horizontal shafts normally positioned on the same plane across the center of the face of said driving-disk, means for automatically changing the planes of said shafts with respect to each other, right and left hand groups of friction disks slidably mounted on said shafts and adapted to contact with the face of said driving-disk and to receive motion therefrom, means whereby each friction-disk of a series will revolve at a different rate of speed from the other disks of the same series, means for compensating the respective speeds of the rear wheels when the vehicle is running off a straight course, and means for imparting to the rear wheels of the vehicle the motion imparted to said friction-disks by said driving-disk.

9. In a transmission mechanism for motor vehicles, a main frame, independent swinging frames, a driving-disk, two series of friction-disks adapted to contact with said driving-disk and each adapted to move either with or independently of the other in said independent frames, separate horizontal shafts for said friction-disks mounted in said swinging frames, the same being normally positioned in the same plane with relation to the face of said driving-disk, means for changing the planes of said shafts with relation to each other and the horizontal plane containing the axis of the driving shaft, and means whereby power is transmitted from the driving-disk to the rear wheels of said vehicle through said friction-disks.

In testimony whereof I have hereunto affixed my signature.

ROY V. MARTIN.